(12) United States Patent
Krogenes et al.

(10) Patent No.: US 11,754,051 B2
(45) Date of Patent: Sep. 12, 2023

(54) FLOATING WINDMILL INSTALLATION

(71) Applicant: Blue-Wind AS, Stavanger (NO)

(72) Inventors: Kåre Olav Krogenes, Haugesund (NO); Lars Helge Helvig, Tananger (NO); Antonie Oosterkamp, Kopervik (NO); Henning Heiberg-Andersen, Bergen (NO); Lars Henning Helvig, Sandnes (NO)

(73) Assignee: BLUE-WIND AS, Stavanger (NO)

( * ) Notice: Subject to any disclaimer, the term of this patent is extended or adjusted under 35 U.S.C. 154(b) by 66 days.

(21) Appl. No.: 17/435,259

(22) PCT Filed: Mar. 5, 2020

(86) PCT No.: PCT/NO2020/050059
§ 371 (c)(1),
(2) Date: Aug. 31, 2021

(87) PCT Pub. No.: WO2020/180194
PCT Pub. Date: Sep. 10, 2020

(65) Prior Publication Data
US 2022/0128034 A1    Apr. 28, 2022

(30) Foreign Application Priority Data

Mar. 5, 2019  (NO) .................................. 20190299
Nov. 28, 2019 (NO) .................................. 20191414

(51) Int. Cl.
*F03D 13/25*  (2016.01)
*F03D 9/30*  (2016.01)
(Continued)

(52) U.S. Cl.
CPC .............. *F03D 13/25* (2016.05); *F03D 9/30* (2016.05); *F03D 13/10* (2016.05); *F03D 13/40* (2016.05);
(Continued)

(58) Field of Classification Search
CPC . F03D 13/25; F03D 9/30; F03D 13/10; F03D 13/40; F03D 9/32; F05B 2220/30;
(Continued)

(56) References Cited

U.S. PATENT DOCUMENTS

2004/0169376 A1* 9/2004 Ruer ..................... E02D 27/425
290/55
2010/0313417 A1  12/2010 Freyssinet
(Continued)

FOREIGN PATENT DOCUMENTS

EP  2574773 A1  4/2013
FR  2990476 A1  11/2013
(Continued)

OTHER PUBLICATIONS

Notification of Transmittal of the International Preliminary Report of Patentability, International application No. PCT/NO2020/0500059, Blue-Wind AS, International Filing Date May 3, 2020, dated Apr. 9, 2021.
(Continued)

*Primary Examiner* — Aaron R Eastman
(74) *Attorney, Agent, or Firm* — FLENER IP & BUSINESS LAW; Zareefa B. Flener

(57) ABSTRACT

The invention relates to a floating windmill installation (1, 1', 1"), wherein the floating windmill installation (1, 1', 1") comprises: —a windmill (10, 10') comprising a tower (14), —a floating installation (20, 20') comprising an aperture (22) penetrating the floating installation (1, 1', 1") for accommodating the tower (14), and—means for raising and lowering the tower (14) up and down through the aperture (22).

9 Claims, 11 Drawing Sheets

(51) Int. Cl.
*F03D 13/10* (2016.01)
*F03D 13/40* (2016.01)

(52) U.S. Cl.
CPC ....... *F05B 2220/30* (2013.01); *F05B 2230/50* (2013.01); *F05B 2230/60* (2013.01)

(58) Field of Classification Search
CPC .............. F05B 2230/50; F05B 2230/60; F05B 2240/93; F05B 2240/95; F05B 2260/02; B63B 2035/446; B63B 21/50; Y02E 10/72; Y02E 10/727
See application file for complete search history.

(56) References Cited

U.S. PATENT DOCUMENTS

| | | |
|---|---|---|
| 2012/0000071 A1 | 1/2012 | Harris |
| 2012/0131880 A1 | 5/2012 | Delago et al. |
| 2013/0078109 A1 | 3/2013 | Schellstede |
| 2013/0236316 A1 | 9/2013 | Bitsch et al. |
| 2015/0275850 A1 | 10/2015 | Numajiri |
| 2017/0037832 A1* | 2/2017 | Friedrich ............. G05D 1/0875 |
| 2023/0002011 A1* | 1/2023 | Meason ................. B63B 21/20 |
| 2023/0002018 A1* | 1/2023 | Martínez De Azcoitia Fernández .............. B63B 1/041 |
| 2023/0020149 A1* | 1/2023 | Madsen .................... F04D 7/02 |

FOREIGN PATENT DOCUMENTS

| | | |
|---|---|---|
| JP | 2018131095 A1 | 8/2018 |
| NO | 20120295 A1 | 9/2013 |
| WO | 2011096816 A1 | 8/2011 |
| WO | 2012058284 A1 | 5/2012 |
| WO | 2018215458 A1 | 11/2018 |
| WO | 2019134242 A1 | 7/2019 |
| WO | 2012169914 A1 | 12/2021 |

OTHER PUBLICATIONS

International Search Report, International application No. PCT/NO2020/0500059, Blue-Wind AS, International Filing Date May 3, 2020, dated May 12, 2020.
Norwegian Search Report for NO20190299, dated Oct. 9, 2019.
Norwegian Search Report for NO20191414, dated Mar. 27, 2020.

* cited by examiner

Fig. 2p
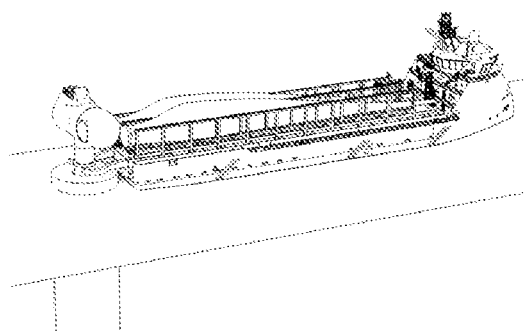
Fig. 2q
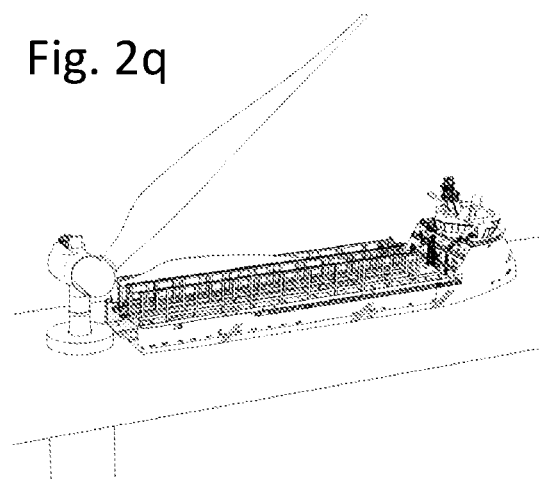
Fig. 2r
Fig. 2s
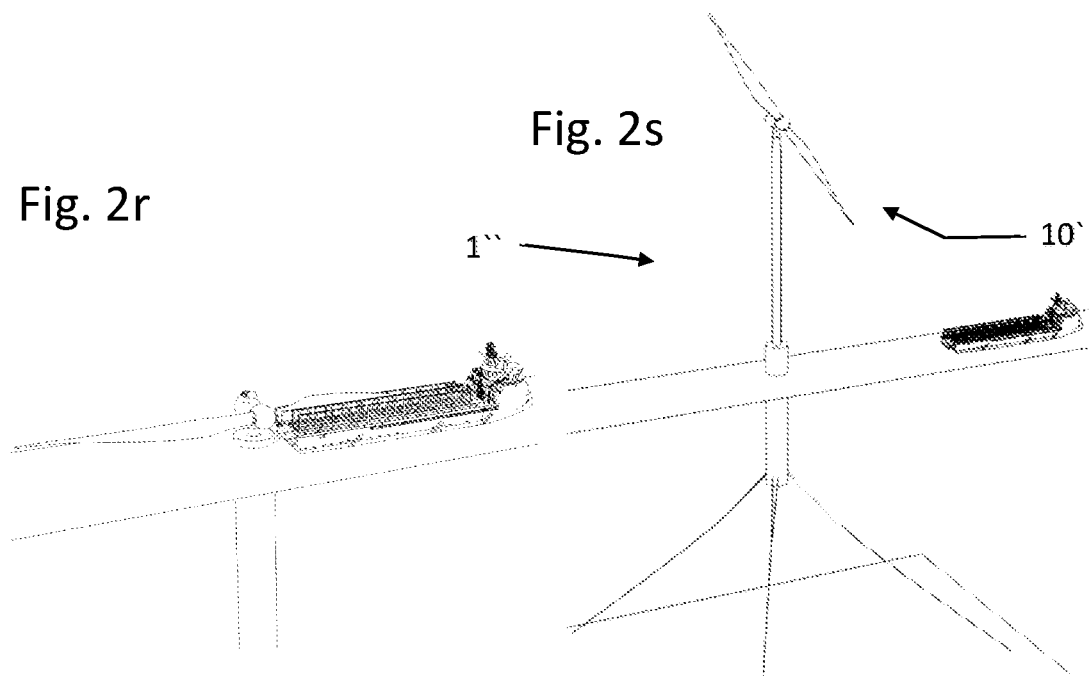

FLOATING WINDMILL INSTALLATION

FIELD OF THE INVENTION

The invention relates to a floating windmill installation.

BACKGROUND OF THE INVENTION

Floating offshore windmills are desirable because it makes it possible to utilize offshore wind resources on deeper water. However, there are some challenges, maintenance is one of them.

When installing and assembling a floating windmill today a lot of the preparations need to be done prior to moving the windmill structure out to the location of the windfarm. This is in a large part due to the need for calm sea and weather conditions for performing marine operations such as lifting of heavy components. Due to the need of deep water for the assembly and preparations, these operations might need to be done at several locations to get access to deep enough water and get access to docks for performing such operation. Due to this the windmill structure might need to be moved between several sites during the building/assembly process. This increases the cost of setting up windfarm with floating windmills.

It is similar for maintenance. Today the common approach to preform maintenance is to tow the windmill structure from the location offshore and into a fjord with calmer water. The fjord should preferably be deep enough for vertically immerse the windmill to gain access for maintenance. This is a time consuming and expensive operation. To perform maintenance offshore on location is challenging due to different heave for the windmill and for a maintenance vessel. Performing maintenance offshore will also requires long periods with calm weather, which is not common on offshore wind locations.

For maintenance that requires disassembly of heavy parts that are located high up the cost of using external lifting vessels are high. Due the weight of components and the height of the windmills, only the largest lifting vessels can perform such operations.

It is need for equipment, systems and methods for simplifying and reducing the cost of maintenance on offshore floating windmills. Especially the cost related to assembly and disassembly. One such cost is the cost for using external lifting vessels.

Disclosure of the State of Art

US2013078109 (A1) describes structures and methods for elevating and retracting offshore wind turbine assemblies. Structures and methods are presented for elevating and retracting offshore wind turbine assemblies mounted on a tower in order to facilitate both service of the assemblies at any time, as well as preservation of the assemblies through storms or other high-wind weather events. Among the structures presented are folding wind turbine blades that may be folded into compact clusters and secured to braces in order to minimize damage during storms or other high-wind events.

Objects of the Present Invention

One object of the invention is to provide a method for performing maintenance offshore on a floating windmill.

Another object is to provide a structure for supporting a windmill offshore.

Another object is to provide a structure for supporting a windmill offshore, which also can act as a platform for performing maintenance on site.

Yet another objective is to provide a floating windmill installation that can store windmill blades.

A further object is to provide a method for disassembly of a windmill fan without the need for an external lifting vessel.

One particular object is to provide a method and a floating installation where a windmill can be raised and lowered to be able to set down windmill blades inside the hull of the floating installation.

One particular object is to provide a method for disassemble and assemble a windmill where the three degrees of freedom of a windmill are used together with the ability to raise and lower the tower of the windmill.

Yet another object is to provide a floating windmill installation where the windmill can be raised and lowered relative to a supporting floating installation.

Yet another object is to provide a floating windmill installation where the windmill can be raised and lowered relative to a supporting floating installation, and the windmill can be fixed to the supporting floating installation during operation.

SUMMARY OF THE INVENTION

In one aspect the invention relates to a floating windmill installation where the floating windmill installation comprises a windmill comprising a tower, a floating installation comprising an aperture penetrating the floating installation for accommodating the tower, and means for raising and lowering the tower up and down through the aperture.

The means for raising and lowering the tower can comprise a ballast tank in the tower adapted to receive and hold fluid.

The floating installation can comprise a ballast tank adapted to receive and hold fluid to be used as ballast to lower and raise the floating installation in the surrounding water.

The floating windmill installation can comprise a system for pressurized air or gas for displacing fluid out of one or more of the ballast tanks.

The means for raising or lowering the tower can comprise pitch rack, gears and motor for providing movement.

The floating installation comprises a connection point for connecting an external supply of fluid for filling or receiving fluid from the ballast tanks.

The floating installation can comprise a connection point for connecting to an external supply of pressurized air or gas, for displacing liquid out of the ballast tank.

The floating installation comprises a blade storage space for storing one or more blade.

The blade storage space can be adapted for storing one or more blades in an vertical orientation.

The tower can comprise a conical section, and the aperture can comprise a mating conical portion, wherein the conical section can be arranged to abut the mating conical portion when the tower is moved a distance up in the aperture due to an upward directed force from an increase in buoyancy of the tower, and the floating installation is affected by means for a downward directed force keeping the floating installation submerged at a first depth, wherein the upwards directed force is greater than the downward directed force when the floating installation is at a first depth and the two forces are equal when the floating installation is moved by the upward directed force of the tower to a second shallower depth.

The means for the downward directed force on the floating installation can be a mooring system comprising an anchor, a mooring line and a mooring weight, wherein the mooring weight is connected to the mooring line at a point between the anchor and the floating installation, so that when the floating installation is at a first depth the mooring weight will rest on the seafloor, and when the floating installation is at a second shallower depth, the mooring weight will be suspended above the seafloor.

The means for the downward directed force affecting the floating installation can be the ballast tank of the floating installation, wherein an increase of ballast liquid will increase the downward directed force.

Part of the interior surface of the aperture facing the tower and/or part of an exterior surface of the tower facing the interior surface of the aperture is covered with a protective layer selected from the list of: cellulose friction paper and graphite friction plates.

In another aspect the invention relates to a method for raising and lowering a windmill of a floating windmill installation, where the method comprises the steps of: accommodate a tower of a windmill in an aperture in a floating installation, and move the tower up or down inside the aperture of the floating installation by use of means for raising and lowering the tower up and down inside the aperture.

The step to move the tower up and down inside the aperture can comprise the step of adjusting a buoyancy of the tower.

The method can further comprise the steps of attaching the floating installation to an anchor on a seabed via a mooring line, attaching a mooring weight to the mooring line at a point between the anchor and the floating installation, thereby submerging the floating installation to a first depth, increasing the buoyancy of the tower, thereby moving the tower upwards inside the aperture until a conical section of the tower abuts a mating tapered conical portion of the aperture when the floating installation is on the first depth, and lifting the floating installation from the first depth to a shallower second depth, wherein the mooring weight is lifted from the seafloor by moving the floating installation from the first depth to the shallower second depth.

| Reference numbers | |
|---|---|
| 1 | Floating windmill installation |
| 1' | Floating windmill installation with a floating installation adapted for storing blades |
| 1" | Floating windmill installation with a two-blade windmill |
| 2 | Water surface |
| 4 | Seafloor |
| 6 | Surrounding water |
| 10 | Windmill |
| 10' | Two blade windmill |
| 11 | Nacelle |
| 12 | Hub |
| 13 | Blade |
| 13a | Tip |
| 13b | Hub interface |
| 12, 13 | Fan |
| 14 | Tower |
| 14a | Upper part (of the tower) |
| 14b | Lower part (of the tower) |
| 14c | Conical section (of the tower) |
| 14d | Reinforcement frame (inside the tower) |
| 15 | Spacer (between the tower and the walls of the aperture) |
| 16 | Protective layer (on tower and/or on the walls of aperture) |
| 20 | Floating installation |
| 20' | Floating installation adapted for storing blades |
| 21 | Hull (of floating installation) |
| 22 | Aperture |
| 22a | Upper portion (of aperture) |
| 22b | Lower portion (of aperture) |
| 22c | Conical portion (of aperture) |
| 23 | Top Deck |
| 24 | Bottom (of floating installation) |
| 25 | Annular space (between the tower and the walls of the aperture) |
| 26 | Blade storage space |
| 26a | Nacelle storage space |
| 28 | Hatch |
| 29 | Horizontal storage platform |
| 29a | Skidable rack |
| 31 | Ballast tank tower |
| 32 | Ballast pipe |
| 33 | Liquid inside tower |
| 34 | Liquid level inside tower |
| 35 | Ballast tank floating installation |
| 36 | Liquid inside floating installation |
| 37 | Liquid level inside floating installation |
| 40 | Mooring system (comprising mooring line, anchor and mooring weight) |
| 41 | Moring line |
| 42 | Anchor |
| 43 | Mooring weight |
| 50 | Service vessel |
| 60 | Transport vessel |
| 60' | Transport vessel with horizontal blade frame |
| 61 | Liftable frame |

DESCRIPTION OF PREFERRED EMBODIMENTS OF THE INVENTION

Figure 1:
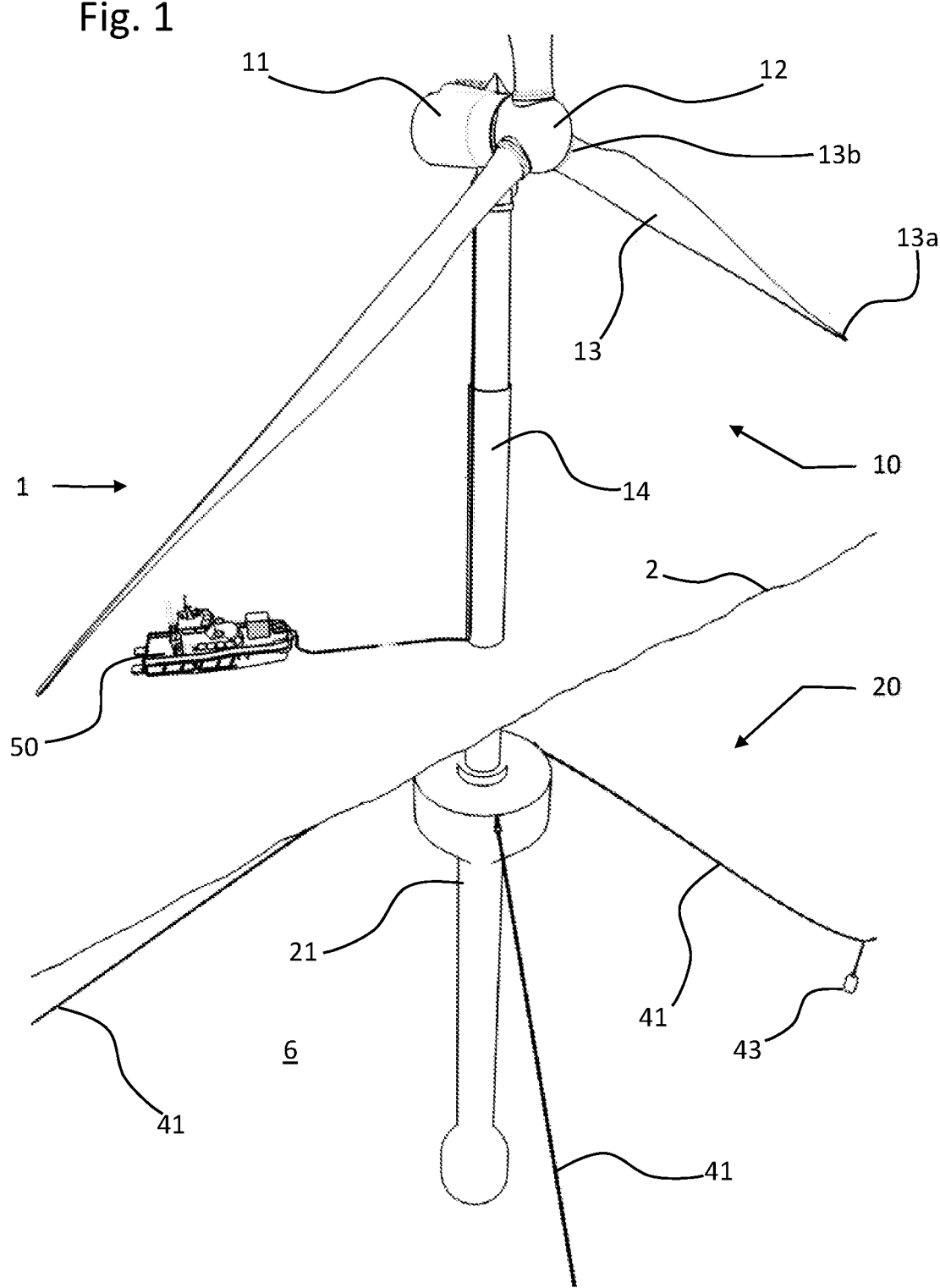
FIG. 1 shows a first embodiment of the invention
Figure 1A:
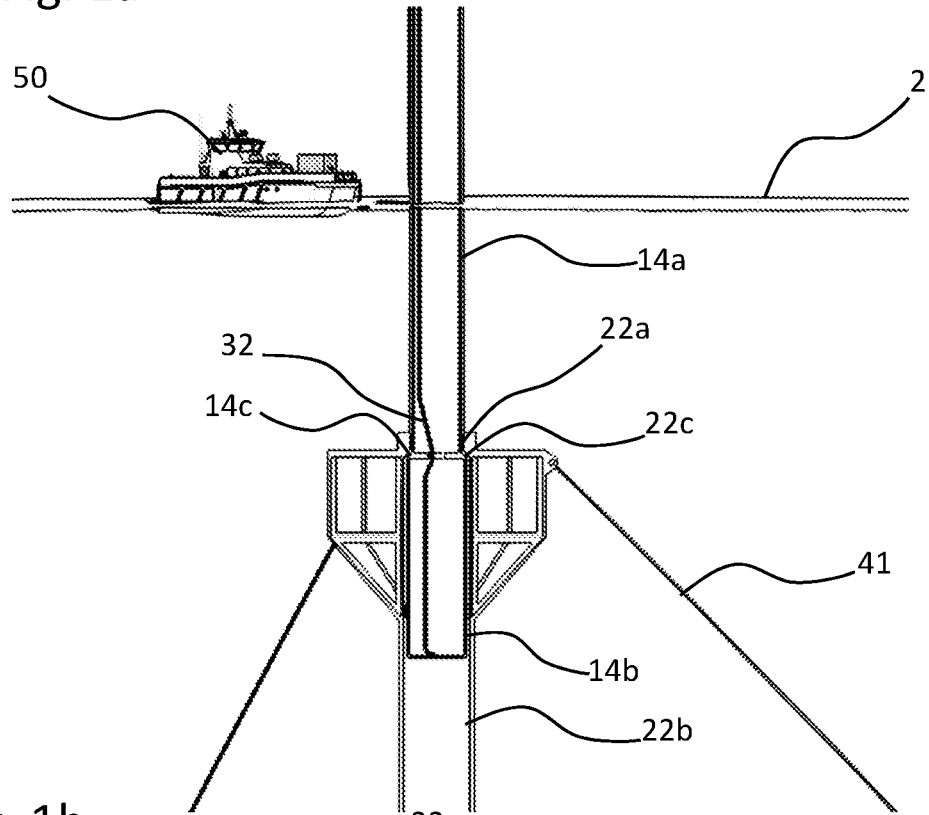
FIG. 1a shows the upper part of the floating installation and the tower in section
Figure 1B:
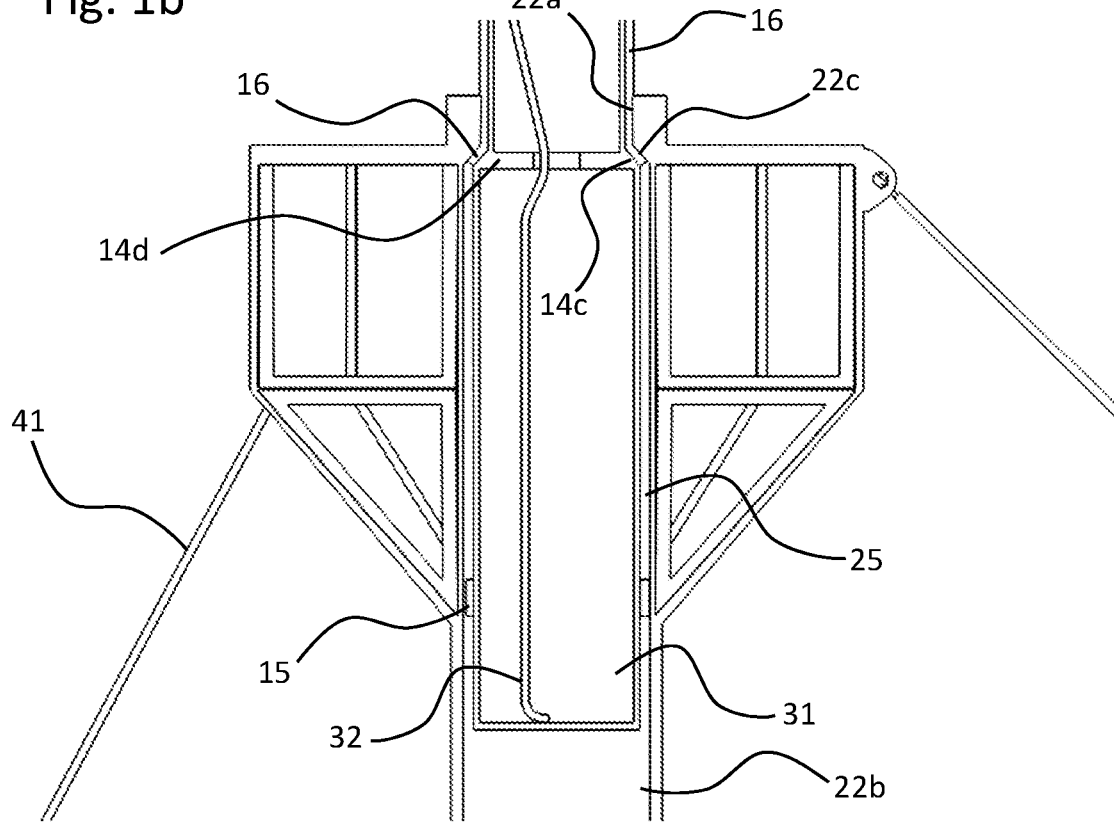
FIG. 1b shows an enlarged view in section of the upper part of the floating installation and the tower.

FIG. 1 shows a floating windmill installation 1. The floating windmill installation 1 comprises a windmill 10 and a floating installation 20.

The windmill 10 comprises a tower 14, a nacelle 11, blades 13 and a hub 12. For the purpose of simplifying, the blades 13 together with the hub 12 is defined as a fan 12, 13. The blade 13 is defined with two ends, a tip 13a and a hub interface 13b. The hub interface 13b is the end that connects to the hub 12.

For the general windmill 10 there are usually three degrees of freedom; azimuth, yaw and pitch. Azimuth is the rotation of the fan 12, 13 that generate torque for power generation. Yaw is the rotation of the nacelle 11 around the longitudinal axis of the tower 14. Yaw is usually used to adjust the windmill 10 with regards to the wind direction to get the fan 12, 13 more or less perpendicular to the direction of the wind. Pitch is the rotation of the blades 13 around their longitudinal axis.

The floating installation 20 comprises a hull 21, and an aperture 22 for accommodating the tower 14 of the windmill 10. The aperture stretches from the top deck 23 of the floating installation 20 to the bottom 24 of the floating installation 20.

The floating windmill installation 1 further comprises means for raising and lowering the windmill 10 through the aperture 22. So, in addition to the three degrees of freedom of a general windmill, the windmill 10 can be raised and lowered relative to the floating installation 20. The three degrees of freedom and the ability to raise and lower the windmill will in some section of the description for short be referred to as the ability to move the windmill 10.

FIG. 1 and 1a-1d shows a first embodiment of the floating windmill installation 1. In this embodiment the hull 21 of the floating installation 20 is shaped similar to an hourglass and floats upright in the surrounding water 6. The floating installation 20 can be equipped with weight in the lower part and space filled with air or other less dens matter in the upper part to secure the desired orientation and to create buoyancy.

The floating installation 20 is moored to the seafloor 4 with mooring lines 41 stretching from the floating installation 20 to anchors 42 on the seafloor 4. Mooring weights 43 is attached to each of the mooring lines 41. The mooring system 40 will preferably keep the whole floating installation 20 submerged below the water surface 2 both when the windmill 10 is raised and when the windmill is lowered. The mooring weights 43 generates a pull on the mooring lines 41 that overcomes the buoyancy of the floating installation 20 hence pulling the floating installation 20 down until the mooring weights 43 rests on the seafloor 4.

Figure 1C:
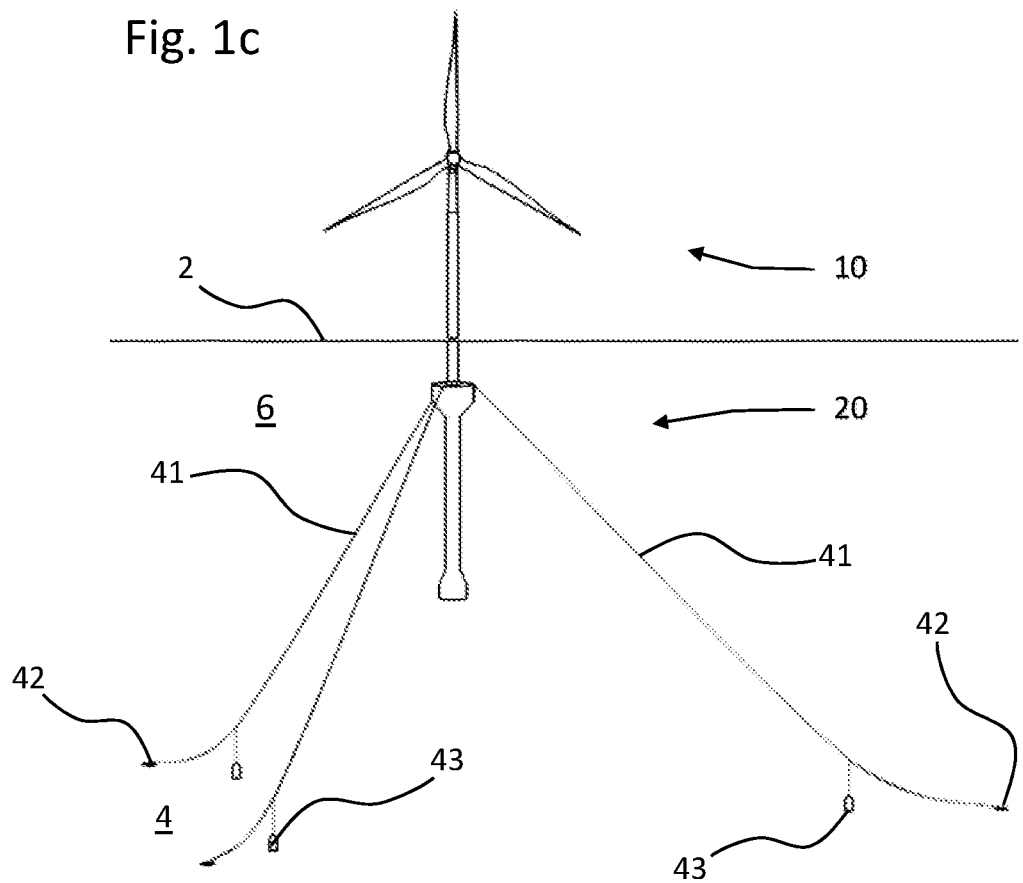
FIG. 1c-1d shows the floating windmill installation with a mooring system
Figure 1D:
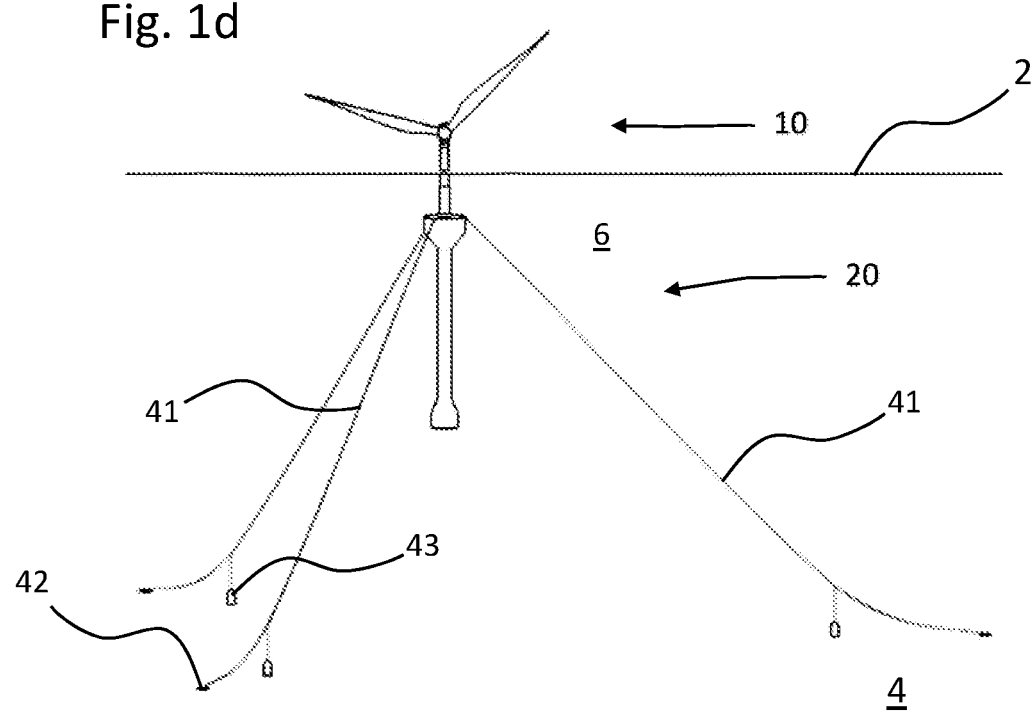
Figure 1E:
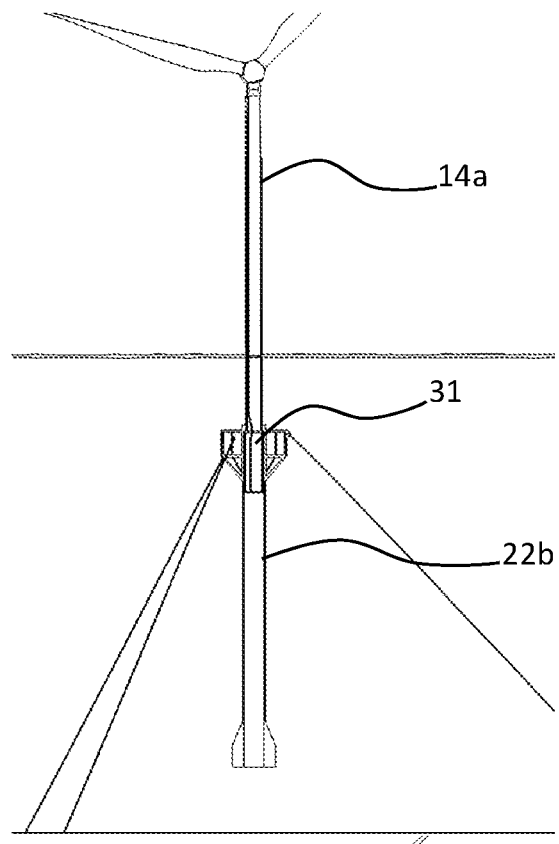
FIG. 1e-1f shows the floating windmill installation partly in section with the windmill in a raised position (FIG. 1e) and a lowered position (FIG. 1f).
Figure 1F:
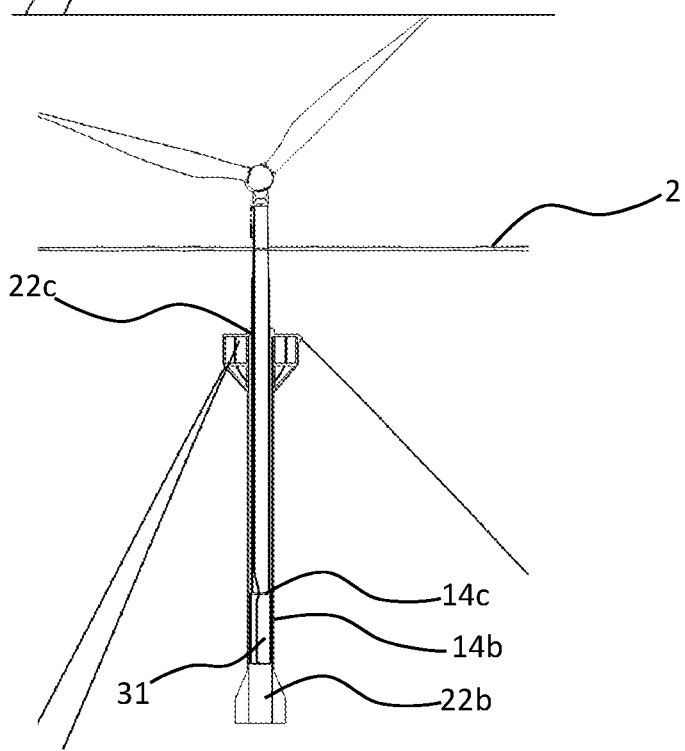

In addition to the mooring lines 41 seen in FIGS. 1c and 1d a separate line can in one end be attached to the coupling point between the mooring weights and the mooring line 41 and in the other end to a lower point of the hull 21 (a lower point compare to the coupling point of the mooring line 41). One purpose of such a line is to stabilize the floating installation 20 in case of current in the surrounding water 6.

An advantage of keeping the whole floating installation 20 submerged below the water surface 2 is that the floating windmill installation 1 will be less affected by waves. This is because only the volume of the relative slim tower 14 will be affected by the fluctuating water level (due to the waves), and the result will be less heave which is an advantage both during operation and maintenance.

The tower 14 of the windmill 10 is hollow and suitable to be filled with fluid and to hold fluid, most preferable water or seawater. A hollow inner of the tower 14 can be one or more ballast tanks 31. Filling the ballast tanks 31 in the hollow interior of the tower 14 is used as means for lowering or raising the tower 14 inside the aperture 22. The tower 14 comprises an upper part 14a and a lower part 14b, the lower part 14b has an increased outer diameter compare to the upper part 14a. The transition between the upper part 14a and the lower part 14b is a conical section 14c. The conical section 14c is reinforced on the inside by a reinforcement frame 14d.

The aperture 22 comprises an upper portion 22a with a smaller inner diameter compare to a lower portion 22b. The transition between the upper portion 22a and the lower portion 22b is a conical portion 22c. The aperture 22 is filled with water when submerged in the surrounding water 6 due to communication with the surrounding water 6.

In FIG. 1d the floating installation 20 is submerged to a first depth, where the mooring weights 43 are resting on the seafloor.

To raise the windmill 10, water is displaced or pumped out of the ballast tanks 31. The buoyancy of the tower will generate an upward directed force. The tower 14 will move up through the aperture 22 until the conical section 14c abuts the mating conical portion 22c of the aperture 22. The floating installation 20 is kept submerged by a downward directed force from the mooring system 40. The floating installation 20 do not have enough buoyancy in itself to lift the mooring weight 43 of the seafloor 4. As more water is displaced or pumped out of the ballast tank 31 the upward directed force from the tower 14 will overcome the downward directed force from the mooring system 40. The tower 14 will then start to lift the floating installation 20 towards the water surface 2 to a shallower second depth, pulling on the mooring lines 41 and lifting the mooring weights 43 of the seafloor 4. At the shallower second depth the two forces are equal and the windmill 10 is now secured to the floating windmill at a desired operational position.

When the floating windmill installation 1 is in the desired operational position as seen in FIG. 1c the mooring weight 43 is lifted a distance up above the seafloor 4 (the position of the mooring weights compare to the seafloor is not clearly visible on the FIG.) Due to the downward pull on the floating installation 20 from the mooring weights 43 and the upwards lift from the buoyancy of the tower 14 the surface of the conical section 14c and the conical portion 22c is forced against each other with great force. This compressional force between the two surfaces secures the tower 14 to the floating installation 20 so the forces from the windmill 10 are transferred to the floating installation 20. In addition, at least one spacer 15 can be placed near the bottom of the tower 14 to maintain a concentric positioning of the tower 14 in the aperture 22. Preferably at least three spacers 15 are placed with equal spacing around the circumference of the tower 14. The spacers 15 can alternatively be placed along the inner surface of the aperture 22. The spacer(s) should preferably not cover 360 degrees around the circumference of the tower 14 as it might block or prevent water from entering and escaping the annular space 25 between the outer surface of the tower 14 and the surface of the aperture 22.

To lower the windmill 10 the ballast tank 31 is filled with water. As the ballast tank 31 is filled with water the tower 14 will start to move down and the floating installation 20 will follow until the mooring weights 43 are resting of the seafloor 4. When the mooring weights 43 are resting on the seafloor 4 the decent of the floating installation 20 stops due to the buoyancy of the floating installation 20 in itself. Further filling of the ballast tank 31 will lead to relative movement between the tower 14 and the floating installation 20 i.e. the floating installation keeps its depth (the first depth) and the tower 14 keeps descending.

The outside of the tower 14 and/or the inside of the aperture 22 can be coated to reduce mechanical wear and friction. The conical section 14c and/or the conical portion 22c is preferably coated with a coating or is covered by a protective layer 16 that provides sufficient friction and rigidity in the coupling between the two surfaces (14c, 22c). The protective layer is preferably comprising cellulose or graphite, such as cellulose friction paper and graphite friction plates.

The floating windmill installation 1 need to be equipped with means for filling and removing water from the ballast tank 31. In one possible embodiment the means for filling and emptying the ballast tank 31 comprises a ballast pipe 32 (see FIGS. 1, 1*a* and 1*b*) that enters the tower 14 from the outside and runs inside the tower 14 all the way down to the bottom of the ballast tank 31. The ballast pipe 32 will preferably enter the tower 14 from the outside at a height that will be above the water surface 2 when the tower 14 is lowered to the lowest level that it is designed for. From where the ballast pipe 32 exits the tower 14 a hose can be connected. The hose can extend down towards the water surface 2, so that a service vessel 50 can get hold of it and connect it to a pump onboard the service vessel 50. The pump can be used to pump water into the ballast tank 31 via the ballast pipe 32 to lower the tower 14. To raise the tower 14 pressurized air can be used to displace water out of the same ballast pipe 32. Hoses and or pipes can be installed in the tower 14 and extend into the ballast tank 31. The ballast tank 31 is preferably air tight so that it can be pressurized for displacing water. Hoses and pipes for pressurized air is not showed in the figures.

As for the other disclosed embodiments the ability to raise and lower the windmill 10 can be used during operation and maintenance. Examples of operations where it can be used is during assembly/disassembly of the windmill, when performing maintenance and for replacing blades 13. When replacing blades 13 the windmill can be moved down to place a blade 13 on a transport vessel 60 as seen in FIG. 2*b*. This will eliminate the need for expensive lifting vessels for such operation.

Figure 2A:
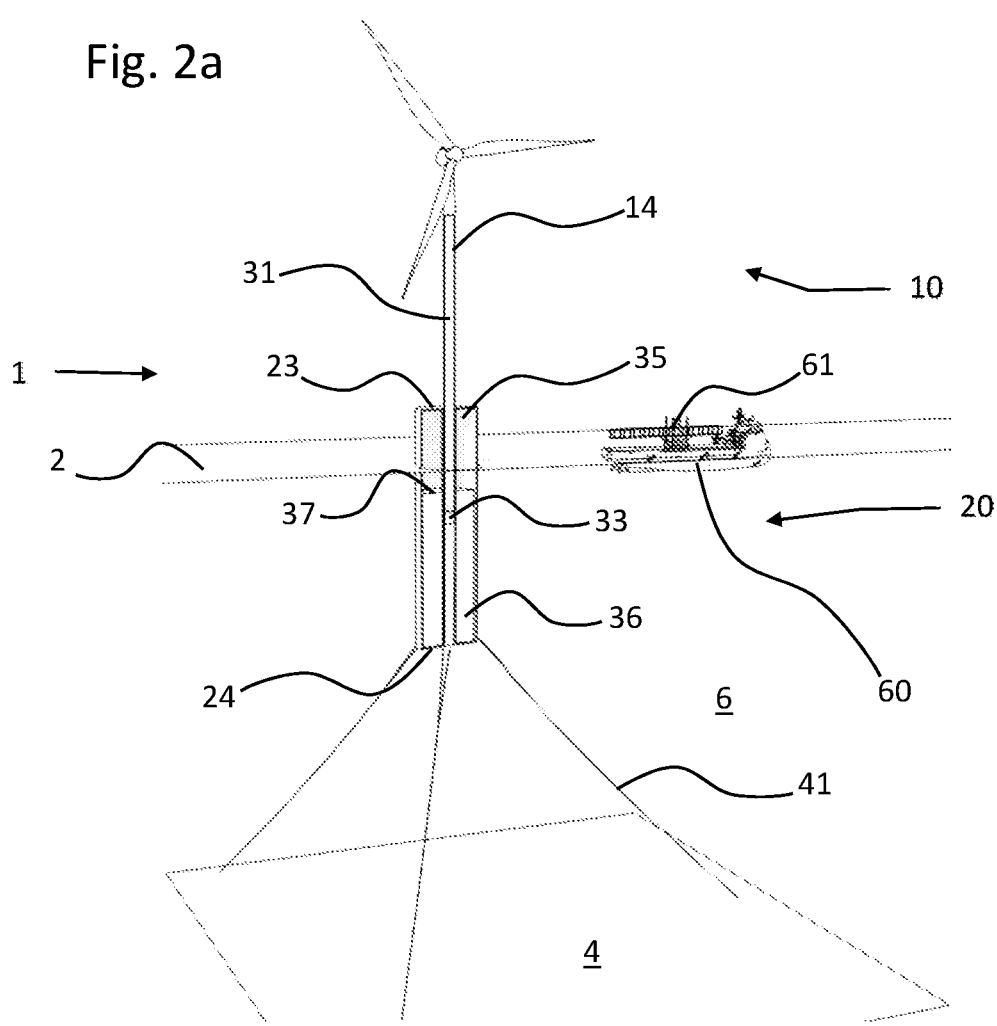
FIG. 2a-2s shows a second embodiment of the floating windmill installation and sequences of installation, assembly and disassembly.
Figure 2B:
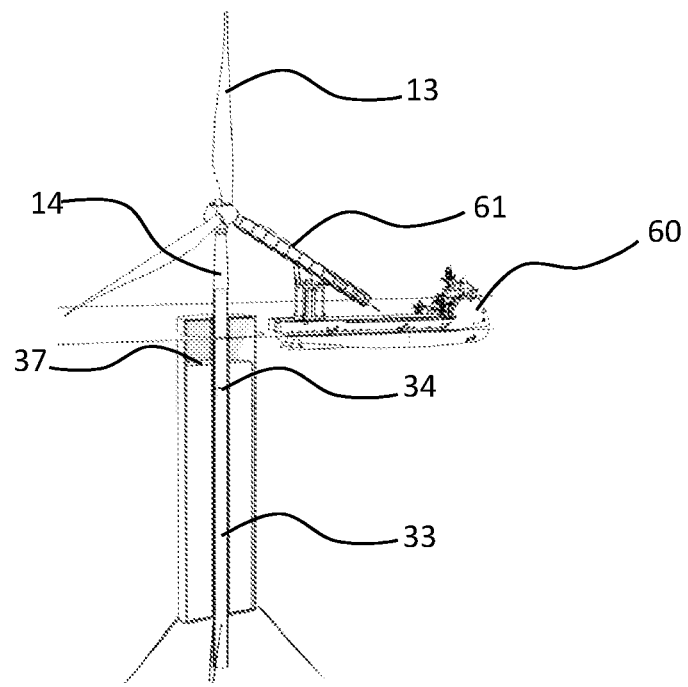

A second embodiment of the floating windmill installation 10 can be seen in FIG. 2*a*-2*s*. For the second embodiment the floating installation 20 has several functions, such as providing buoyancy, stability, means for anchoring and providing a platform to be used when performing maintenance on the windmill 10 or on the floating installation 20 itself.

The floating installation 20 is designed with the aperture 22 penetrating the floating installation 20 from the top deck 23 to the bottom 24. This aperture 22 is a channel running through the entire floating installation 20 from top to bottom and can be a moonpool. This aperture 22 is designed to accommodate the tower 14. The tower 14 is often longer than the vertical length of the floating installation 20. To be able to lower the nacelle 14 down towards the top deck 23 of the floating installation 20 the tower 14 need to extend out of the aperture 22 and down in the water 6 below the floating installation 1.

To be able to raise and lower the tower 14 inside the aperture 22, the floating windmill installation 1 need to be equipped with suitable means for lowering and raising of the tower 14.

For fully being able to exploit the possibilities raising from the ability to raise and lower the tower 14 it can be an advantage to enable remote control over the means for raising and lowering the tower 14.

The ability to lowering and raise the tower 14 of a floating windmill 10, will reduce or eliminate the need for large and expansive lifting vessels when assembling, disassembling or performing maintenance on blades 13, the nacelle 11 or other heavy components.

In one possible embodiment the tower 14 can be raised and lowered inside the aperture 22 by adjusting the buoyancy of the tower 14. The tower 14 then needs to float freely inside the aperture 22 of the floating installation 20. To enable this the tower 14 can be equipped with ballast tanks 31. The ballast tanks 31, can simply be one or several compartments in the inner volume of the tower 14, that can receive and hold fluid to be used as ballast.

To regulate the buoyancy i.e. the height of the windmill 10 over water there are several possible solutions. In one possible embodiment pressurized air or gas is used to displace water out of the tower through an opening near the bottom end to raise the tower 14. By bleeding of said air or gas from the tower 14 water can flow back in through an opening near the bottom end, lowering the tower 14. In another possible embodiment pumps and valves are used to pump water inn and out of the tower 14 and to contain the water in the tower 14.

A mechanism for locking the position of the tower 14 relative to the floating installation 20 can be included in the floating windmill installation 1. The possibility of locking the tower 14 to the floating installation 20 can be beneficial in several situation for instance while transporting the floating windmill installation 1, or when personnel is onboard the floating windmill installation 20.

An alternative way of moving the tower 14 up and down relative to the floating installation 20 can be pitch racks along the tower 14 and gears and motor for providing movement.

The floating windmill installation 1 can also be equipped to raise and lower the floating installation 20 relative to the sea surface 2. This can be done by moving water inn and out of the floating installation to adjust the buoyancy. To be able to do this the floating installation 20 needs to be equipped with ballast tanks 35. The ballast tanks 35 of the floating installation 20 can simply be one or several compartments inside the hull 21 of the floating installation adapted to receive and hold fluid to be used as ballast. An associated system for moving water inn and out of the hull 21 of the floating installation 20 is also needed. The system for adjusting the buoyancy of the floating installation 20 can be similar to the solution described for the tower 14 i.e. valves and pumps, a pressurized air system or a combination.

In addition to buoyancy adjusting liquid ballast 33, 36 both the tower 14 and the floating installation 20 can be equipped with solid ballast for safely maintaining an orientation in the water 6.

The ability to adjust the buoyancy (raise or lower it in the surrounding water 6) of the floating installation 20 simplifies operations such as entering the floating installation 20, adjusting the height of the top deck 23 when a service vessel 50 or transport vessel 60, 60' is approaching to interact with the floating windmill installation 1 etc.

When the floating windmill installation 1 is operational the tower 14 and the floating installation 20 can float independent of each other. The floating installation 20 is maintaining the orientation of the tower 14 and the position in the horizontal plane.

Since the two floating bodies (floating installation 20 and windmill 10) are floating independently of each other one will get a heave reducing effect on the windmill 10.

This heave reducing effect is a result that originates from several factors. One of them is the slim structure of the tower 14 compare to a typical floating structure for a windmill. The buoyancy of a body with a lower volume in the waterline will be less affected by the fluctuating water level (waves). So, by decoupling the movement of the tower 14 from the movement of the floating installation 20 one achieves less heave for the tower 14 i.e. the windmill 10. Since the windmill 10 do not gain any buoyancy from the floating installation 20 the length of the tower 14 below water needs to be adapted to this to get sufficient buoyancy.

This heave reducing effect is important for enabling maintenance and other operations that includes lifting of heavy components to and from the windmill 10. Reducing or eliminating the heave of the windmill 10 will expand the weather window i.e. more days in a typical year will be open to perform operations of such character.

To illustrate the use of liquid ballast to adjust the buoyancy of the tower 14 and the floating installation 20 FIG. 2a-2l shows the tower 14 and the floating installation 20 in section. This is making it clear how the liquid level 34 of the ballast tank 31 of the tower 14 and the liquid level 37 of the ballast tank 35 of the floating installation 20 changes with the draught of the tower 14 and the draught of the floating installation 20.

Three sub embodiments of the floating windmill installation 1 will be described together with the related operations to disassemble or assemble the fan 12, 13 of such sub embodiments. These operations are described as examples of operations that are enabled by the inventive features that enables raising and lowering the tower 14 and the floating installation 20 in the surrounding water 6. Other operations are also enabled by the floating windmill installation 1 and the related transport vessels 60, such as replacing one or more blades 13 or replacing other heavy components on the floating windmill installation 1.

The three sub embodiments can in short be described as:
 a floating windmill installation 1 with a three-blade windmill 20,
 a floating windmill installation 1' with a floating installation 20' adapted for storing blades 13, and
 a floating windmill installation 1" with a two-blade windmill 10'.

All the three alternative sub-embodiments can be combined with the inventive feature of raising and lowering the tower 14 for instance by such means as adjusting the buoyancy of the tower 14.

The floating windmill installation 1 with a three-blade windmill poses a challenge with regards to lowering the tower 14 to perform maintenance and/or connect/disconnects blades 13. At one point when lowering the tower 14 the tip 13a of one or two blades 13 will reach the water surface 2. It is not desirable to immerse blades into the water 6 surrounding the floating installation 20. To overcome this problem a transport vessel 60 with a lifting and motion compensation system for lifting and motion compensating a liftable frame 61 is developed.

Figure 2C:
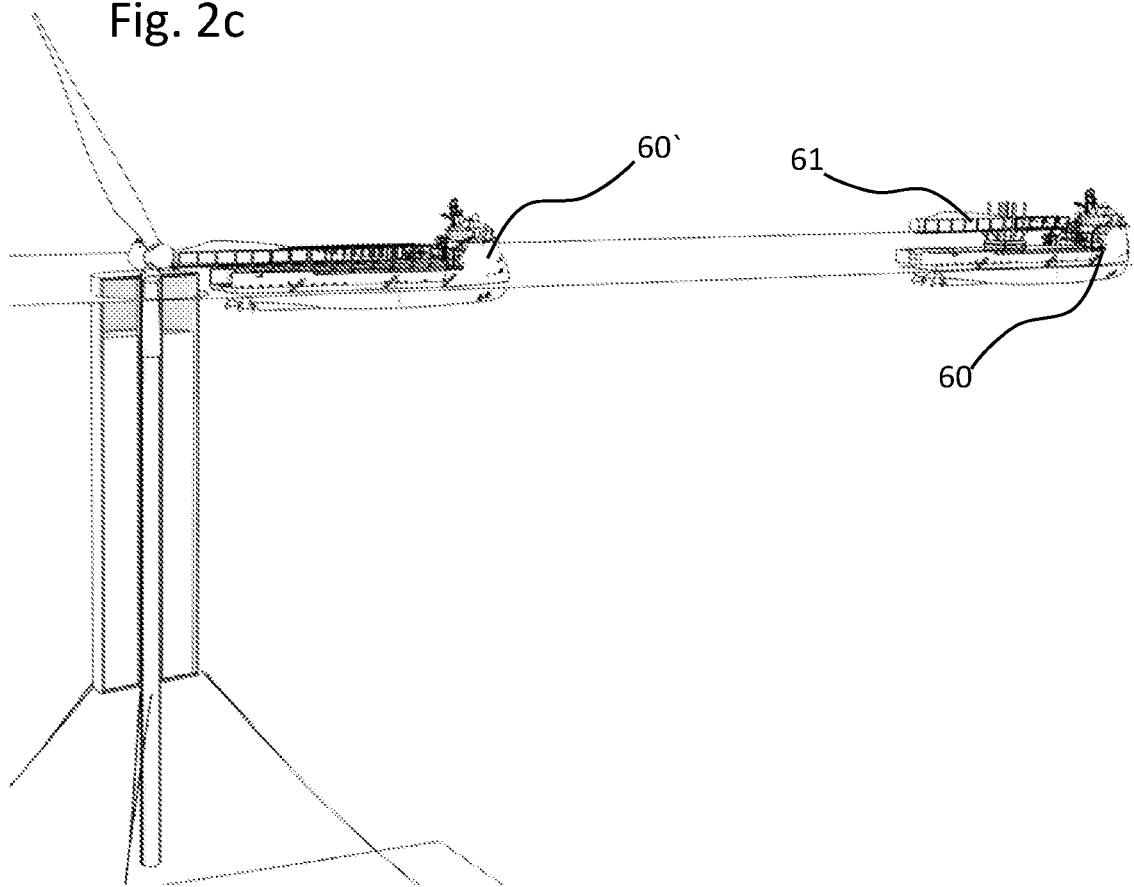

As seen in FIG. 2a-2c the operational sequence can be as follows:
 approach the floating windmill installation 1 with a stern of the transport vessel 60,
 lift and angel a liftable frame 61 by using a lifting and motion compensation system, and
 use the three degrees of freedom of the windmill 10 together with the ability to raise and lower the tower 14 of the windmill 10 to position the blade 13 in the liftable frame 61,
 disconnect the blade 13.

The liftable frame 61 is compensated for heave, role and pitch by the use of the motion compensation system. In combination with the maneuvering of the transport vessel 60 the motion compensation system maintains the liftable frame 61 in a stable position. The windmill 10 is kept in a stable position due to the heave reducing design in combination with the mooring lines 41. As both the blade 13 and the liftable frame 61 is stable the blade 13 can be placed in the liftable frame 61 by using the ability to move the windmill 10 in combination with maneuvering the liftable frame 61 in position.

Figure 2D:
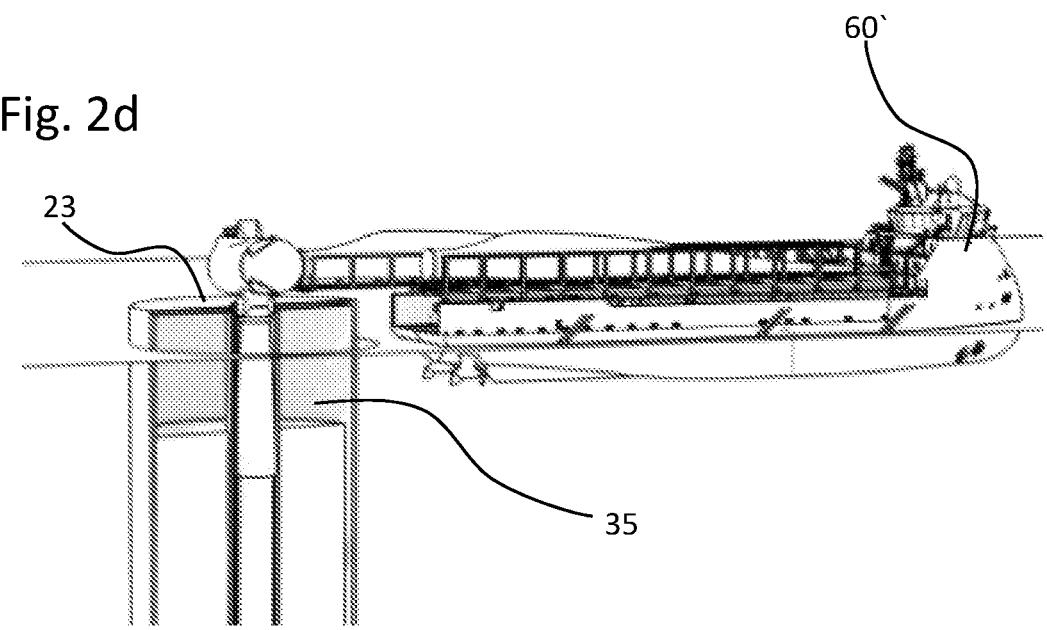
Figure 2E:
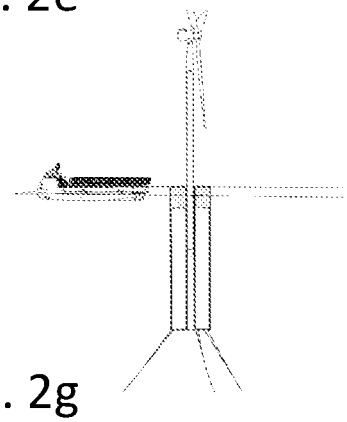
Figure 2F:
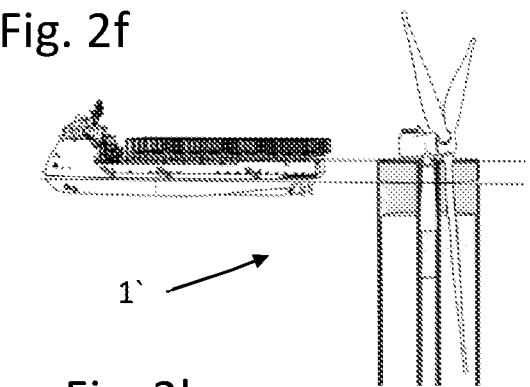

As seen in FIG. 2d the operation can continue. With one blade disconnected from the windmill 10 a second transport vessel 60' with two horizontal frames can take the place of the first transport vessel 60.
 position the second transport vessel 60',
 use the ability to move the windmill 10 to place a second blade 13 in the first horizontal frame on the second transport vessel 60',
 disconnect the blade 13 from the hub 12,
 position the second horizontal frame for receiving the next blade 13,
 use the ability to move the windmill 10 to place the blade 13 in the horizontal frame,
 disconnect the blade 13 from the hub 12.

As an optional feature the horizontal frames can be skidded a distance out from the stern of the transport vessel 60 while performing the operation to be able to keep a safe distance between the transport vessel 60 and the floating windmill installation 1.

In addition to the possibility of moving or skidding the frame it can, similar to the liftable frame, be motion compensated so that it is not affected by the movements of the second transport vessel 60'.

The second embodiment is a floating windmill installation 1' with a three-blade windmill 10 and with a floating installation 20' adapted for storing blades 13. With reference to FIG. 2e-2l the disassembly of the fan 12, 13 will be described.

To avoid immersing one or two blades 13 in the water surrounding the floating installation 20' when lowering the tower 14, the floating installation 20' is designed and equipped to receive and store one or more blades 13 vertically. To disassemble the fan 12, 13 of the windmill 10 the possibility to move the tower 14 up and down is used in combination with the tree degrees of freedom (azimuth, yaw and pitch) to maneuver the first blade 13 down into the storage space inside the floating installation 20.

As seen in FIG. 2e-2l the operational sequence can be as follows:
 rotate the fan 12, 13 (azimuth) (if needed) until the tip 13a of one of the blades 13 points down towards the floating installation 1',
 rotate the nacelle 11 (yaw) (if needed) until the tip 13a is above the storage space (this can also be done before the azimuth rotation),
 lower the tower 14 so the blade 13 slides down into the hull 21 of the floating installation 20 and adjust the pitch of the blade 13 if needed,
 secure the blade inside the hull 21, and disconnect the blade 13 from the hub 12.

Figure 2G:
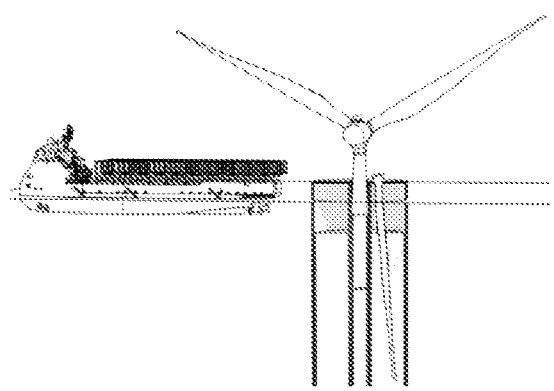
Figure 2H:
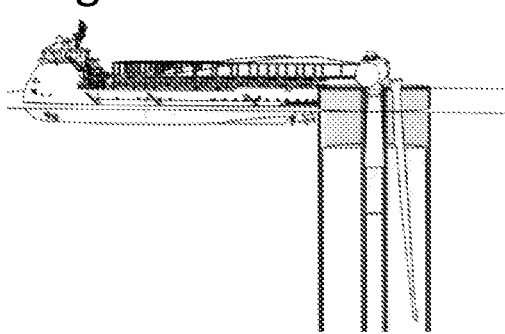
Figure 2I:
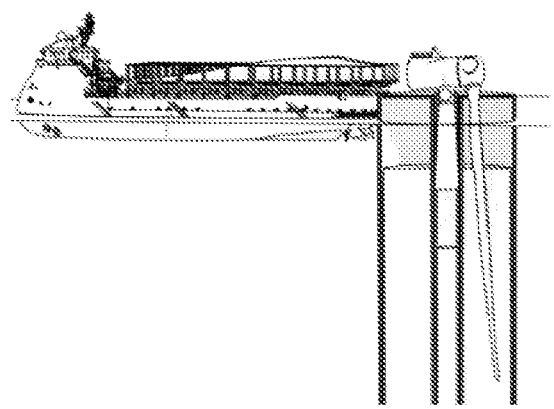
Figure 2J:
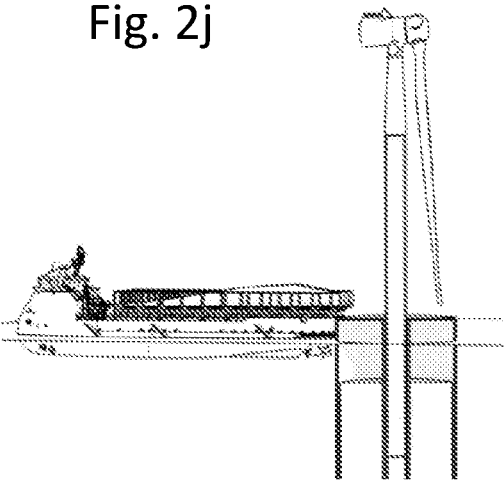
Figure 2K:
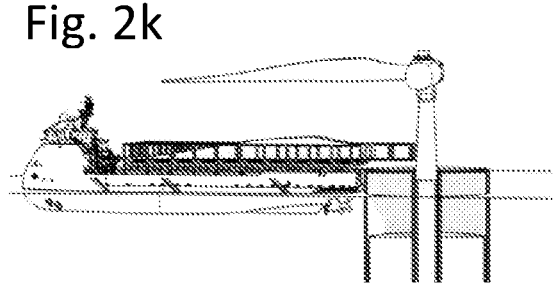
Figure 2L:
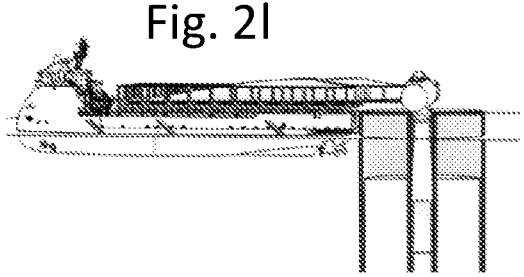
Figure 2M:
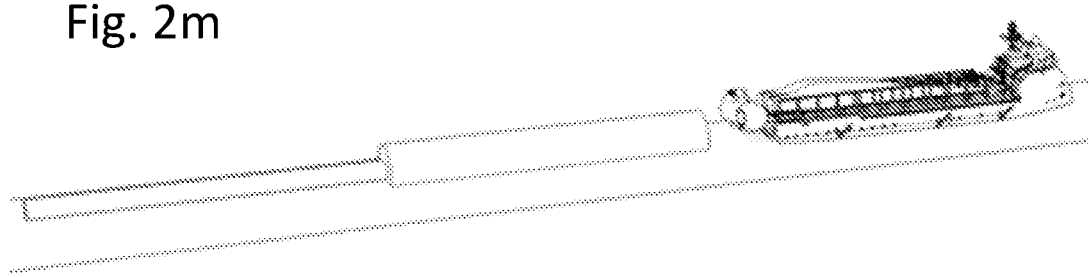
Figure 2N:
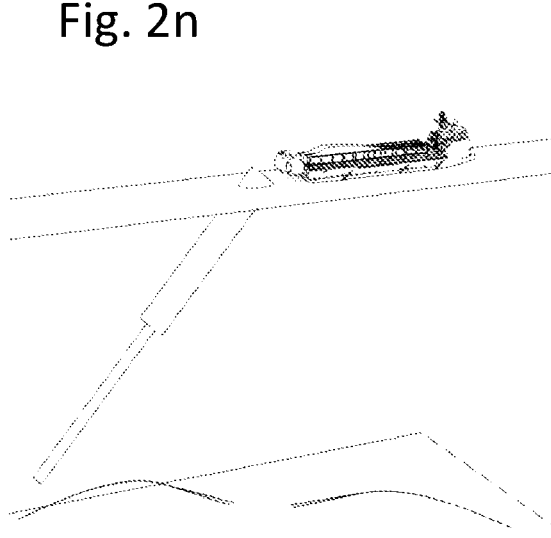
Figure 2O:
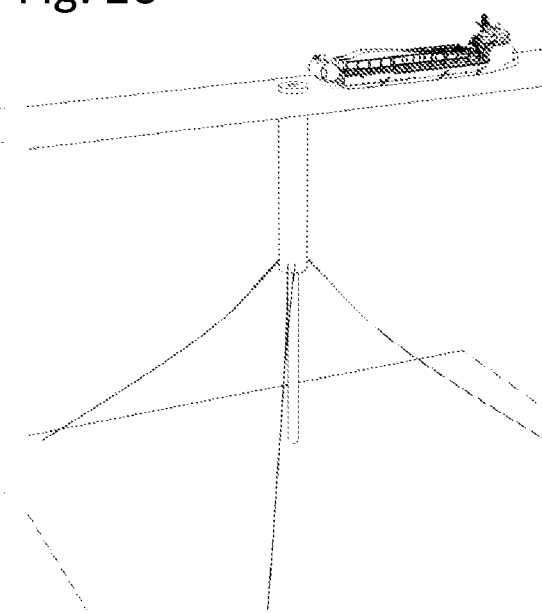

After the first blade is disconnected and stored inside the floating installation 20 the two remaining blades can be laid down on a transport vessel 60' with three horizontal skidable frames. As seen in FIG. 2g-2h.

The first blade 13 is now stored in the floating installation 20 and if it is to be placed onto the service vessel 60' it can be connected to the hub 12 of the windmill 10 again, and the windmill 10 can lift the blade 13 onto a third skidable horizontal frame onboard the transport vessel 60'. As seen in FIG. 2h-2l.

The third embodiment is a floating windmill installation 1" with a two-blade windmill 10'. By using a two-blade windmill instead of a three blade windmill the nacelle can be lowered down all the way to the top deck 23 of the floating installation 20 without immersing any blades 13 into the surrounding water 6. The blades 13 can due to this be laid directly down on the vessel, or be picked up from a transport vessel 60' with horizontal frames, using the possibility to move the tower 14 up and down in combination with the windmills three degrees of freedom (azimuth, yaw and pitch). The sequence of installing a floating windmill installation 1" with a two-blade windmill 10' at sea and assemble the nacelle 11 and fan 12,13 is showed in FIG. 2m-2s.

Using several floating windmill installation 1 that is adapted for raising and lowering the windmill 10 in a windfarm opens up for new possibilities when it comes to optimizing the power output from the windfarm. By adjusting the height of individual windmills in the windfarm one can reduce the blockage, and wake effects. The blockage effect arises from wind slowing down as it approaches wind turbines. There is an individual blockage effect for every turbine and a global effect for the whole windfarm, which is larger than the sum of the individual effects. There is a wake after each windmill where the wind slows down. This effects, with windmill shielding and impacting each other can be reduced by optimizing the relative position of each windmill fan 12, 13.

Another possibility that is enabled by the possibility to lower and raise the tower 14 is that the windmill 10 can be lowered during storms and rough weather. This can be done to avoid damage during extreme weather conditions.

The installation and assembly process that is showed for a two-blade windmill 10' in FIG. 2m-2s can be used for all embodiments of the invention. To enable such a method for a three-blade windmill 10 a transport vessel 60 with a lifting and motion compensation system that lifts the liftable frame 61 (as seen in FIG. 2b) need to be used in addition. This transport vessel 60 with the liftable frame 61 is needed to mount the last blade 13.

A floating installation 20' without a windmill can be used as a support vessel for a floating windmill park. The floating installation for such an application needs to comprise a lifting installation for lifting heavy windmill components such as blades and internal storage space for storing several blades. A floating installation for such an application does not necessarily need to comprise an aperture.

In one aspect the second embodiment of the invention relates to a floating windmill installation 1, 1', 1", where the floating windmill installation comprises:
- a windmill 10, 10' comprising a tower 14,
- a floating installation 20, 20' comprising an aperture 22, said aperture 22 penetrating the floating installation 20, 20' from a top deck 23 to a bottom 24, for accommodating the tower 14, and
- means for raising and lowering the tower 14 up and down through the aperture 22.

In another aspect the second embodiment of the invention relates to a method to raise or lower a windmill 10, 10', where the windmill is part of a floating windmill installation 1, 1', 1" and that the windmill 10, 10' is raised or lowered relative to a floating installation 20, 20' and that the method comprises the following steps:
- accommodate a tower 14 of a windmill 10, 10' in an aperture 22 in the floating installation 20, 20' and
- move the tower 14 up or down inside the aperture 22 of the floating installation 20, 20' to raise or lower the windmill 10, 10'.

In the following a third embodiment of the invention will be described. This embodiment can be seen in FIGS. 3 and 3a-3h. The floating installation 20 is in this embodiment a spare buoy, and comprises in one possible embodiment a hull 21, an aperture 22, a blade storage space 26, a nacelle storage space 26a, a top deck 23, a hatch 28, a horizontal storage platform 29 and a skidable rack 29a.

The floating installation 20 has several functions, such as providing buoyancy, stability, means for anchoring and providing shelter and storage space during transportation, mounting dismounting and maintenance.

As it can be an advantage to store the blades 13, hub 12 and the nacelle 11 sheltered inside the floating installation 20 the floating installation 20 needs to be designed and equipped for this purpose.

The floating installation 20 is designed with an aperture 22 penetrating the floating installation from top to bottom. This aperture 22 is a channel running from the top of the floating installation 20 to the bottom of the floating installation 20 and can be a moon pool. This aperture 22 is designed to accommodate the tower 14. The tower 14 is often longer than the depth of the floating installation 20. To be able to lower the nacelle 11 and hub 14 down towards the deck 23 on the floating installation 20 an aperture 22 is needed so the bottom end of the tower 14 can be lowered down in the surrounding water 6 below the floating installation 20.

To be able to raise and lower the tower 14 inside the aperture 22 the floating installation 1 need to be equipped with suitable means for lowering and raising of the tower 14. Such means can be one or more pitch racks on the tower 14 and gears and motor for providing movement or any other means obvious to one skilled in the art.

For storing the blades 13 inside the floating installation 20 it needs to be equipped with means for hanging of and supporting the blades 13 inside the blade storage space 26. Preferably, the blades 13 will be stored in a vertical orientation with the hub interface 13b pointing up and the tip 13a pointing down.

The use of the term vertical orientation should not be understood as a 100% accurate orientation, but as an orientation that is approximately vertical.

Figure 3:
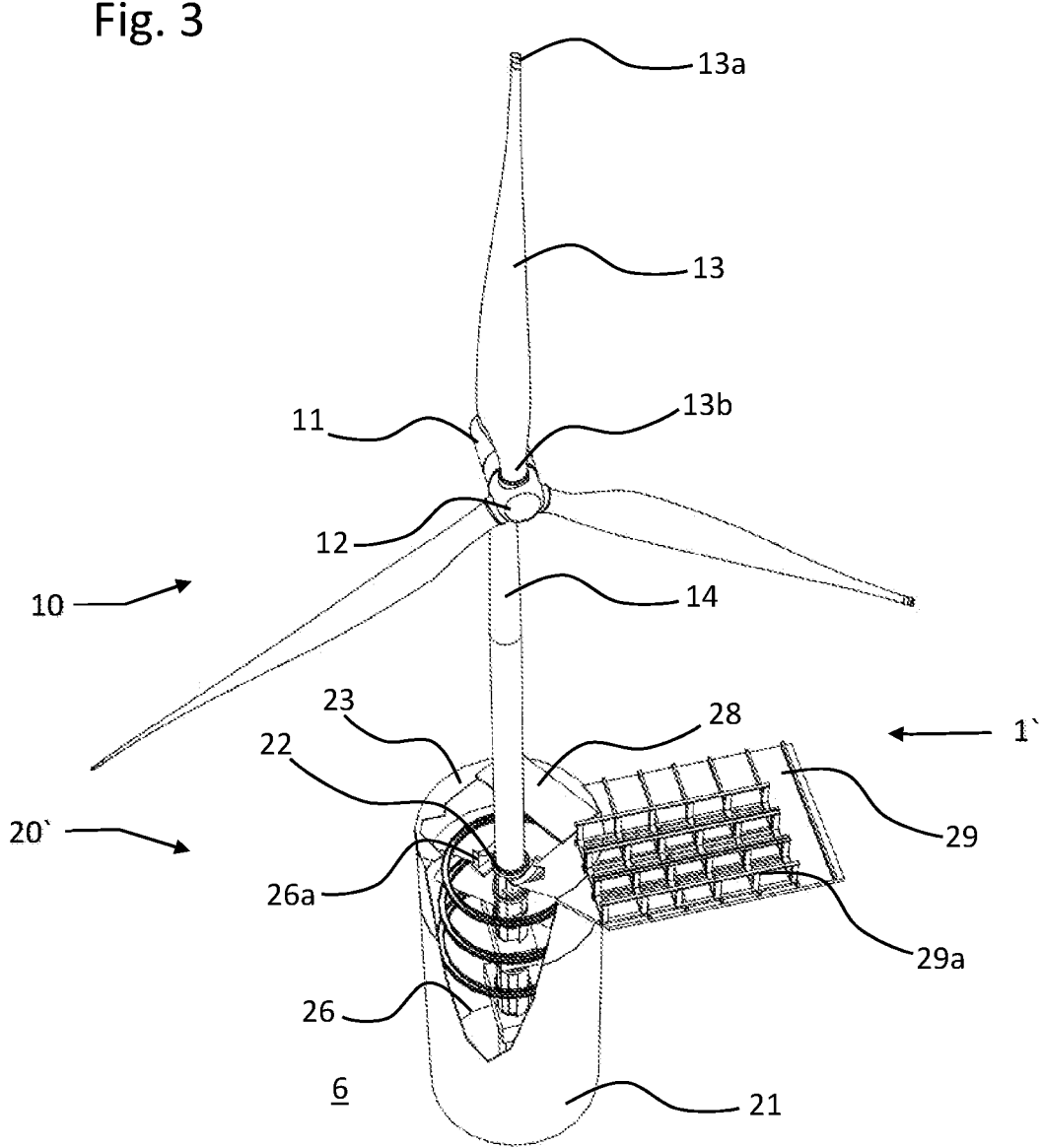
FIG. 3 shows a third embodiment of the floating windmill installation.
Figure 3A:
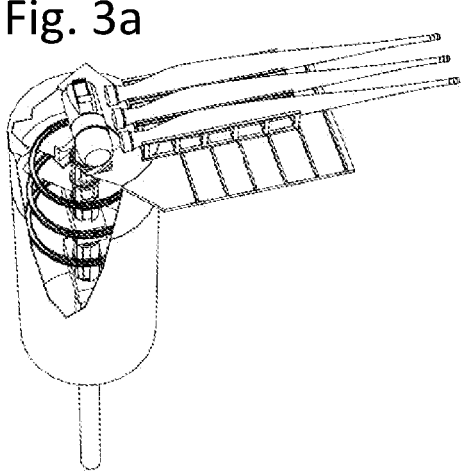
FIG. 3a-3h shows assembly and disassembly of the fan of the third embodiment of the floating windmill installation.
Figure 3B:
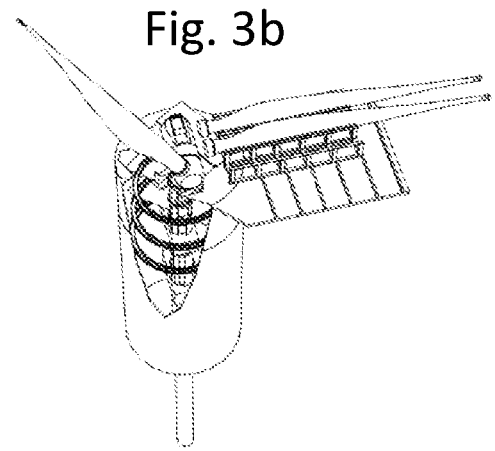
Figure 3C:
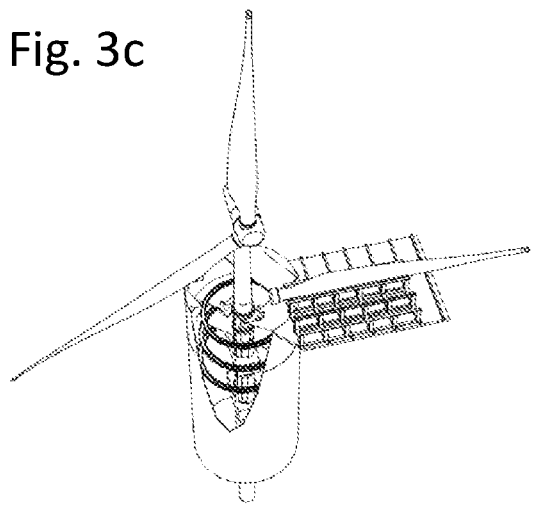
Figure 3D:
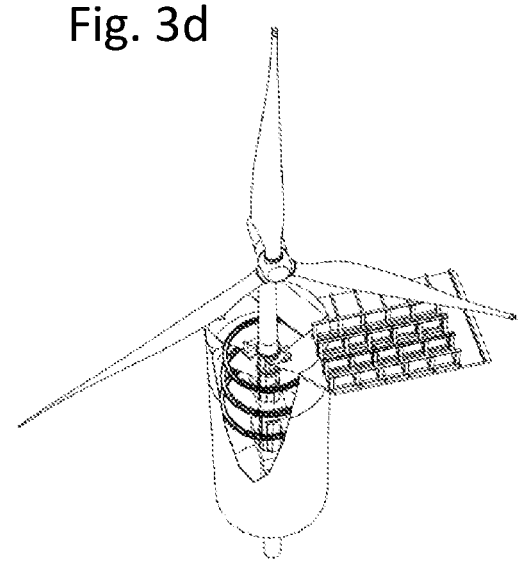

The floating installation 20 can be a spare buoy with an aperture 22, equipped with a blade storage space 26 for hanging of blades 13 as seen in FIG. 3. To disassemble the fan 12, 13 of the windmill 10 the possibility to move the tower 14 up and down is used in combination with the tree degrees of freedom (azimuth, yaw and pitch) to maneuver the blades 13 down into the blade storage space 26 inside the floating installation 1. When all the blades 13 are hung off inside the floating installation 20, the nacelle 11 can be lowered further down into the floating installation 20 into the nacelle storage space 26a where it can rest on a crib. The hatch 28 can seal of the opening on top of the floating installation 20.

To be able to hang of the blades 13 in the storage space 26 the floating installation 20 can be equipped with a rack shaped to support the blades 13 or a set of fingers. Such a rack or set of fingers or similar, need to be strong enough to support the weight of a blade 13 without damaging them. If needed a collar or similar can be mounted near the hub interface 13b on the blade 13 before the blade 13 is hung of on a set of fingers. The collar will then provide a ledge to be hung of on the fingers.

As it might be the case that the blades 13 are longer than the depth of the floating installation 20. The blades 13 can be split into two segments and hung of separately, or the blades can have a stickup above the floating installation as seen in FIG. 3h.

With the blades 13 and the nacelle 11 inside the floating installation 20, maintenance can be carried out in a sheltered environment inside the hull 21 or the floating windmill installation 1 can be towed to another location. One possible sequence for disassembly is showed in FIG. 3e-3h.

Based on the same principles the fan 12, 13 can be assembled when the blades 13 are stored inside the hull 21 of the floating installation 20. The three degrees of freedom (azimuth, yaw and pitch) together with the possibility to raise and lower the tower 14 can be used to maneuver the hub 12 in place so the blades 13 can be connected to the hub 12, and then lifted by raising the tower 14. One possible sequence for assembly can be FIG. 3h-3e (reversed order compared to disassembly).

One can also use the storage space 26 for storing one or more spare blades 13. So, if the need for replacing one or more blades 13 appears, it can be done without the assistance of a lifting vessel and without transporting new blade 13 out offshore.

In the following possible methods for assembly and disassembly will be described in detail.

The operation of assembling the fan 12, 13 with the blades placed on a horizontal storage platform (see FIG. 3a-3d) can be done in the following steps:
 skid the skidable rack 29a to position the first blade 13,
 convey the first blade 13 towards the hub 12 and connect the blade 13 to the hub 12,
 rotate the fan 12, 13 to orient the hub 12 for the next blade 13,
 perform the same steps for the remaining blades 13.

In some possible embodiments the assembly of the last blade 13 proves difficult due to the first blade 13 comes in conflict with the top of the floating installation 20. If this is the case, the skidable rack 29a can be equipped with lifting means for lifting the rack or lifting the hub interface 13b. Means for lifting can comprise hydraulic cylinder in each corner of the skidable rack 29a or hydraulic cylinders for lifting the hub interface 13b, or any other means obvious for a person skilled in the art.

The operation for disassembling the fan 12, 13 (see FIG. 3e-3h) can be done in the following steps:
 if needed rotate the fan 12, 13 (azimuth) until the tip 13a of one of the blades 13 points down towards the floating installation 20,
 if needed rotate the nacelle 11 (yaw) until the tip 13a is above the storage space 26 (this can also be done before the azimuth rotation),
 lower the tower 14 so the blade 13 slides into the storage space 26 and adjust the pitch of the blade 13 if needed to slide the blade 13 down in storage space 26,
 secure the blade inside the storage space 26, and disconnect the blade 13 from the hub 12,
 raise the tower 14 until the fan 12, 13 with the remaining blades 13 can be rotated (azimuth) without the blades hitting the floating installation 20,
 start over again and preform the same steps until all remaining blades 13 are stored inside the blade storage space 26,
 when all blades are securely stored inside the blade storage space 26, lower the nacelle 11 down into the nacelle storage space 26a, and
 close the hatch 28.

Figure 3E:
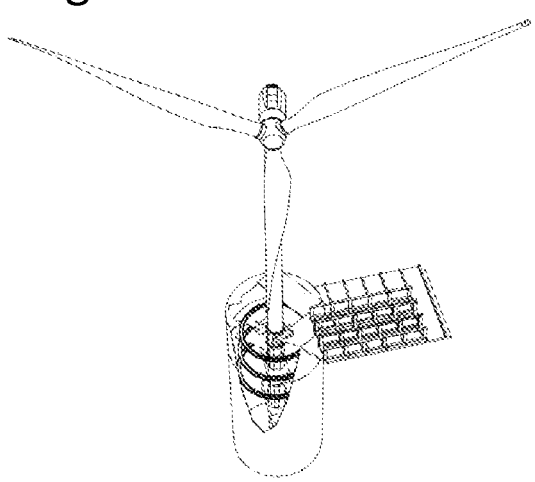
Figure 3F:
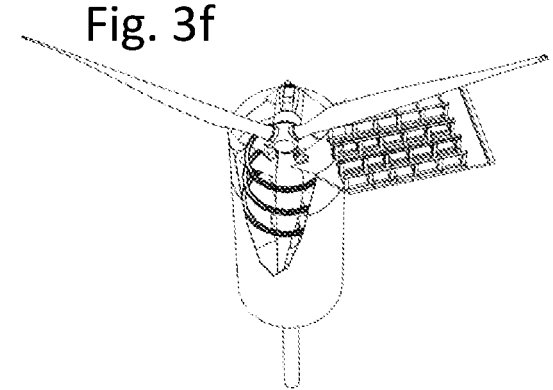
Figure 3G:
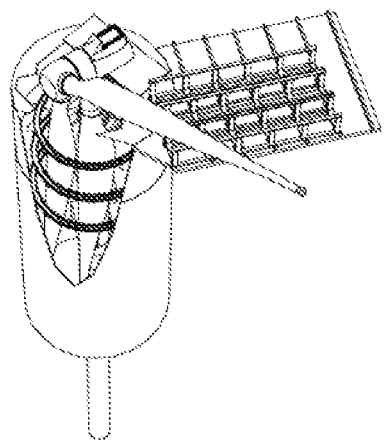
Figure 3H:
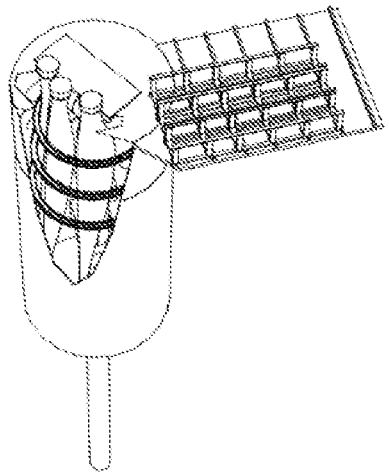

The operation of assembling the fan 12, 13 can also be done when the blades 13 are stored inside the storage space 26 (see FIG. 3h-3e reverses order). Then it can be done in the following steps:
 if needed rotate the hub 12 (azimuth) until the hub 12 is oriented to connect to the desired blade 13,
 if needed rotate the nacelle 11 (yaw) until the hub 12 is above the location in the storage space 26 (this can also be done before the azimuth rotation),
 lower the tower 14 so the hub 12 is in position for connecting the blade 13,
 raise the tower 13 up from the floating installation 20 until the fan 12, 13 with the remaining blades 13 can be rotated (azimuth) without the blades 13 hitting the floating installation 20,
 start over again and preform the same steps until all remaining blades 13 are mounted to the hub 12.

Mounting and dismounting the blades 13 to/from the hub 12 can be done using a horizontal storage platform 29 on the side of the floating installation 20. The horizontal storage platform 29 can be equipped with a skidable rack 29a for supporting the blades 13 during transport and storage. The skidable rack 29a can be movable on rails in two directions, so the blades 13 can be skidded in position for mounting on the hub 20. The ability to move the rack 29a together with the ability to rotate (azimuth, yaw and pitch) and raising and lowering the tower 14 permits for assembly and disassembly of the fan 12, 13. As mention there might be a need for lifting or tilting the skidable rack 29a relative to the horizontal storage platform 29. This can be done using hydraulics or any other means obvious to the one skilled in the art.

One possible sequence for assembly using a horizontal storage platform 29 is showed in FIG. 3a-3d. The disassembly can be done in the reversed order FIG. 3g-3a.

In one aspect the third embodiment relates to a floating installation 1 for a windmill 10 where the floating installation 20 comprises:
 a aperture 22 penetrating the floating installation 20 from top to bottom for accommodating a tower 14,
 means for raising and lowering the tower 14 up and down through the aperture 22, and
 storage space 26 for storing one or more blades 13 in a vertical orientation in the floating installation 20.

In another aspect the third embodiment relates to a method for disassemble a blade 13 from a hub 12 on a windmill 10 mounted on a floating installation 20 and storing said blade 13 in said floating installation 20, where the method comprises the following steps:
 use azimuth, yaw and pitch rotation to position the blade 13 above a desired vertical storage space 26 inside a floating installation 20,
 lowering the tower 14 until the downward pointing blade 13 is fully or partly contained inside the floating installation 20, and
 hang of the blade 13 inside the floating installation 20 and disconnect it from the hub 12.

The invention claimed is:

1. A floating windmill installation (1, 1', 1"), comprising:
 a windmill (10, 10') comprising a tower (14),
 a floating installation (20, 20') comprising an aperture (22) penetrating the floating installation (20, 20') for accommodating the tower (14), and
 means for raising and lowering the tower (14) up and down through the aperture (22),
 wherein the tower (14) comprises a conical section (14c), and the aperture (22) comprises a mating conical portion (22c), wherein the conical section (14c) is arranged to abut the mating conical portion (22c) when the tower (14) is moved a distance up in the aperture (22) due to an upward directed force from an increase in buoyancy of the tower (14), and the floating installation (20) is affected by means for a downward directed force keeping the floating installation submerged at a first depth,
 wherein the upwards directed force is equal to the downward directed force when the floating installation (20)

is at a first depth and the upward directed force overcomes the downward directed force when the floating installation (20) is moved by the upward directed force of the tower (14) to a second shallower depth, wherein said means for the downward directed force on the floating installation (20) is a mooring system (40) comprising an anchor (42), a mooring line (41) and a mooring weight (43), wherein the mooring weight (43) is connected to the mooring line (41) at a point between the anchor (42) and the floating installation (20), so that when the floating installation (20) is at a the first depth the mooring weight (43) will rest on the seafloor (4), and when the floating installation (20) is at a the second shallower depth, the mooring weight (43) will be suspended above the seafloor (4);

wherein the means for raising or lowering the tower (14) comprises pitch rack, gears and motor for providing movement.

2. The floating windmill Installation (1, 1', 1") according to claim 1, wherein the means for raising and lowering the tower (14) comprises one or more ballast tanks (31) in the tower (14) adapted to receive and hold fluid.

3. The floating windmill installation (1, 1', 1") according to claim 2, wherein the floating windmill installation (1, 1', 1") comprises a system for pressurized air or gas for displacing fluid out of one or more of the one or more ballast tanks (31, 35).

4. The floating windmill installation (1, 1', 1") according to claim 2, wherein the floating windmill installation (1, 1', 1") comprises a connection point for connecting an external supply of fluid for filling or receiving fluid from the one or more ballast tanks (31, 35).

5. The floating windmill installation (1, 1', 1") according to claim 1, wherein the floating installation (20, 20') comprises a ballast tank (35) adapted to receive and hold fluid to be used as ballast to lower and raise the floating installation (20, 20') in the surrounding water (6).

6. The floating windmill installation (1, 1', 1") according to claim 1, wherein the floating windmill installation (1, 1', 1") comprises a connection point for connecting to an external supply of pressurized air or gas, for displacing liquid (33, 36) out of the one or more ballast tanks (31, 35).

7. The floating windmill installation (1') according to claim 1, wherein the floating installation (20') comprises a blade storage space (26) for storing one or more blade (13).

8. The floating windmill installation (1') according to claim 7, wherein the blade storage space (26) is adapted for storing one or more blades (13) in a vertical orientation.

9. A floating windmill installation (1, 1', 1"), comprising:
a windmill (10, 10') comprising a tower (14),
a floating installation (20, 20') comprising an aperture (22) penetrating the floating installation (20, 20') for accommodating the tower (14), and
means for raising and lowering the tower (14) up and down through the aperture (22),
wherein the tower (14) comprises a conical section (14c), and the aperture (22) comprises a mating conical portion (22c), wherein the conical section (14c) is arranged to abut the mating conical portion (22c) when the tower (14) is moved a distance up in the aperture (22) due to an upward directed force from an increase in buoyancy of the tower (14), and the floating installation (20) is affected by means for a downward directed force keeping the floating installation submerged at a first depth,
wherein the upwards directed force is equal to the downward directed force when the floating installation (20) is at a first depth and the upward directed force overcomes the downward directed force when the floating installation (20) is moved by the upward directed force of the tower (14) to a second shallower depth,
wherein said means for the downward directed force on the floating installation (20) is a mooring system (40) comprising an anchor (42), a mooring line (41) and a mooring weight (43), wherein the mooring weight (43) is connected to the mooring line (41) at a point between the anchor (42) and the floating installation (20), so that when the floating installation (20) is at a the first depth the mooring weight (43) will rest on the seafloor (4), and when the floating installation (20) is at a the second shallower depth, the mooring weight (43) will be suspended above the seafloor (4); and
wherein part of the interior surface of the aperture (22) facing the tower (14) and/or part of an exterior surface of the tower (14) facing the interior surface of the aperture (22) is covered with a protective layer (16) selected from the group consisting of: cellulose friction paper and graphite friction plates.

* * * * *